United States Patent
Mtauweg

(10) Patent No.: US 10,669,997 B2
(45) Date of Patent: Jun. 2, 2020

(54) WIND TURBINE

(71) Applicant: Wobben Properties GmbH, Aurich (DE)

(72) Inventor: Samer Mtauweg, Bremerhaven (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/304,581

(22) PCT Filed: Apr. 6, 2017

(86) PCT No.: PCT/EP2017/058226
§ 371 (c)(1),
(2) Date: Nov. 26, 2018

(87) PCT Pub. No.: WO2017/202533
PCT Pub. Date: Nov. 30, 2017

(65) Prior Publication Data
US 2019/0195204 A1  Jun. 27, 2019

(30) Foreign Application Priority Data
May 27, 2016  (DE) .................. 10 2016 209 206

(51) Int. Cl.
*F03D 80/70* (2016.01)
*F16C 17/26* (2006.01)
(Continued)

(52) U.S. Cl.
CPC ............. *F03D 80/70* (2016.05); *F03D 9/25* (2016.05); *F03D 15/20* (2016.05); *F16C 17/26* (2013.01);
(Continued)

(58) Field of Classification Search
USPC ...................................... 290/44, 55
See application file for complete search history.

(56) References Cited

U.S. PATENT DOCUMENTS 4,474,529 A * 10/1984 Kinsey .................. F03D 3/0472
   415/4.2
6,872,049 B2 * 3/2005 Christensen .............. F03D 1/00
   415/124.1
(Continued)

FOREIGN PATENT DOCUMENTS

CN   102734060 A   10/2012
CN   102834611 A   12/2012
(Continued)

*Primary Examiner* — Pedro J Cuevas
(74) *Attorney, Agent, or Firm* — Seed Intellectual Property Law Group LLP

(57) ABSTRACT

A wind power installation comprising one or more rotor blades, a rotor hub to which the rotor blade or blades are mounted, and a generator for generating electrical power, wherein the generator has a generator stator and a generator rotor which is non-rotatably connected to the rotor hub and which is rotatable about an axis, wherein the rotor hub and the generator rotor have a common main bearing system or means which is subdivided into two bearing portions which are spaced from each other in the direction of the axis, wherein in that the first bearing portion has a first radial plain bearing and a first axial plain bearing and the second bearing portion has a second radial plain bearing and a second axial plain bearing.

17 Claims, 2 Drawing Sheets

(51) Int. Cl.
  *F16C 33/16* (2006.01)
  *F16C 33/18* (2006.01)
  *F03D 9/25* (2016.01)
  *F03D 15/20* (2016.01)
  *H02K 7/08* (2006.01)
  *H02K 7/18* (2006.01)

(52) U.S. Cl.
  CPC .............. *F16C 33/16* (2013.01); *F16C 33/18* (2013.01); *H02K 7/088* (2013.01); *H02K 7/1838* (2013.01); *F05B 2240/52* (2013.01); *F05B 2240/53* (2013.01); *F05B 2240/54* (2013.01); *F05B 2280/1071* (2013.01); *F05B 2280/2001* (2013.01); *F05B 2280/2006* (2013.01); *F05B 2280/4002* (2013.01); *F16C 2360/31* (2013.01); *Y02E 10/722* (2013.01); *Y02E 10/725* (2013.01)

(56) References Cited

U.S. PATENT DOCUMENTS

| | | | |
|---|---|---|---|
| 6,911,741 B2 | 6/2005 | Pettersen et al. | |
| 8,222,759 B2* | 7/2012 | Loeschner | F16C 19/386 |
| | | | 290/44 |
| 8,912,680 B2* | 12/2014 | Gelmini | H02K 5/1735 |
| | | | 290/55 |
| 8,937,397 B2* | 1/2015 | Gelmini | F03D 80/70 |
| | | | 290/55 |
| 8,937,398 B2* | 1/2015 | Casazza | H02K 1/2773 |
| | | | 290/55 |
| 8,957,555 B2* | 2/2015 | Pabst | H02K 1/2773 |
| | | | 310/59 |
| 8,975,770 B2* | 3/2015 | Gelmini | H02K 1/185 |
| | | | 290/54 |
| 9,006,918 B2* | 4/2015 | Casazza | H02K 1/2773 |
| | | | 290/44 |
| 9,145,869 B2 | 9/2015 | Thomsen et al. | |
| 9,279,413 B2* | 3/2016 | Ebbesen | F03D 80/70 |
| 9,394,887 B2* | 7/2016 | Roer | F03D 9/25 |
| 9,689,174 B2* | 6/2017 | Gotfredsen | E04H 12/00 |
| 10,094,419 B2* | 10/2018 | Mtauweg | F03B 11/06 |
| 2010/0244454 A1* | 9/2010 | Loeschner | F03D 9/25 |
| | | | 290/55 |
| 2011/0311362 A1 | 12/2011 | Corts | |
| 2012/0228878 A1 | 9/2012 | Perner et al. | |
| 2012/0263598 A1 | 10/2012 | Thomsen et al. | |
| 2013/0071246 A1 | 3/2013 | Kari et al. | |
| 2014/0169952 A1 | 6/2014 | Pedersen et al. | |
| 2014/0193264 A1 | 7/2014 | Pedersen et al. | |
| 2014/0321781 A1* | 10/2014 | Pedersen | F16C 37/00 |
| | | | 384/320 |
| 2015/0017000 A1 | 1/2015 | Sato et al. | |
| 2015/0047270 A1* | 2/2015 | Gotfredsen | F16C 33/26 |
| | | | 52/123.1 |
| 2015/0148271 A1 | 5/2015 | Golob et al. | |
| 2015/0192110 A1* | 7/2015 | Pedersen | F16H 1/227 |
| | | | 475/149 |
| 2015/0244221 A1* | 8/2015 | Canini | H02K 1/148 |
| | | | 290/55 |
| 2015/0330367 A1* | 11/2015 | Homsy | F16C 35/12 |
| | | | 416/244 A |
| 2015/0369284 A1 | 12/2015 | Hager et al. | |
| 2017/0067450 A1* | 3/2017 | Kumar | F03D 80/70 |
| 2017/0082141 A1* | 3/2017 | Mtauweg | F03B 11/06 |
| 2017/0307008 A1 | 10/2017 | Heege et al. | |
| 2019/0145378 A1* | 5/2019 | Knoop | F03D 7/0224 |
| | | | 416/234 |
| 2019/0170115 A1* | 6/2019 | Mtauweg | F16C 33/203 |

FOREIGN PATENT DOCUMENTS

| | | |
|---|---|---|
| CN | 104583621 A | 4/2015 |
| DE | 10255745 A1 | 6/2004 |
| DE | 202007002609 U1 | 5/2008 |
| DE | 102009053879 A1 | 5/2011 |
| DE | 102013004339 A1 | 9/2014 |
| DE | 102014205637 A1 | 10/2015 |
| EP | 2511521 | 10/2012 |
| EP | 2568167 A1 | 3/2013 |
| EP | 2568168 A1 | 3/2013 |
| JP | H0819284 B2 | 2/1996 |
| JP | 2006118552 A | 5/2006 |
| JP | 2006-312688 A | 11/2006 |
| RU | 19886 U1 | 10/2001 |
| RU | 2280786 C2 | 7/2006 |
| RU | 118701 U1 | 7/2012 |
| RU | 2558401 C2 | 8/2015 |
| WO | 2011/127509 A1 | 10/2011 |
| WO | 2013182583 A1 | 12/2013 |
| WO | 2013191163 A1 | 12/2013 |
| WO | 2016055391 A1 | 4/2016 |

* cited by examiner

WIND TURBINE

BACKGROUND

Technical Field

The present invention concerns a wind power installation comprising one or more rotor blades.

Description of the Related Art

Wind power installations of the above-indicated kind are generally known. They are used to convert the rotational movement of the rotor hub, that occurs as a result of wind flowing around the rotor blades, into electrical power.

In that respect important significance is attributed to a main bearing means of the rotor hub and the generator. The main bearing means is subjected to axial and also radial loadings as a consequence of the rotational movement and the wind load. In the course of the years gone by many different bearing concepts have become established in practice but also many have failed to become established. In the more recent past for example the use of a main bearing means having only one bearing portion has become increasingly popular, with one or more torque bearing means being used in the bearing portion. Although the advantage of a torque bearing means is beyond dispute as a highly viable and sustainable solution with a high level of capability for carrying axial forces, radial forces and for carrying tilting moments, there is nonetheless a need to arrive at alternative bearing concepts which in particular require a good compromise in terms of longevity, maintenance involvement, acoustic damping characteristics and cost efficiency.

BRIEF SUMMARY

The present invention concerns a wind power installation comprising one or more rotor blades, a rotor hub to which the rotor blade or blades are mounted, and a generator for generating electrical power, wherein the generator has a generator stator and a generator rotor which is non-rotatably connected to the rotor hub and which is rotatable about an axis, wherein the rotor hub and the generator rotor are non-rotatably connected Provided is a wind power installation in which the main bearing concept is improved in regard to the above-indicated properties.

In particular the wind power installation includes a first bearing portion having a first radial plain bearing and a first axial plain bearing and the second bearing portion having a second radial plain bearing and a second axial plain bearing. The invention makes use of the realization that, in comparison with bearing means having only one bearing portion, better distribution of the forces is achieved. In particular it has also turned out to be an advantage that the distribution of the axial forces to the two bearing portions each with their dedicated axial bearings involves a lower level of bearing wear. In comparison with conventional bearing means like for example torque bearings or fixed/free bearing means there is a further advantage in that the tilting moments, in particular in the form of pitching and yawing moments, which act on the rotor, can be better supported in isolation as axial and radial force components by the two bearings. In general the dual-bearing solution is less sensitive in relation to yawing moments of the rotor in comparison with the torque bearing.

An advantageous development of the invention provides that the first and second radial bearings each have a plain bearing lining and wherein the plain bearing linings of the first and second radial plain bearings are arranged on a common first bearing ring which is preferably an inner ring. The radial bearings are preferably arranged on the inner ring on separate steps of identical or different diameters.

In a further preferred embodiment the wind power installation has a pod having a fixedly installed machine carrier and the first bearing ring is fixedly connected to the machine carrier. In comparison with a conventional configuration with a journal on which dedicated rolling bearings or plain bearings with their own bearing rings have to be respectively mounted in two bearing portions this embodiment represents a significant structural simplification insofar as the first bearing ring directly carries the plain bearing linings both for the first bearing portion and also for the second bearing portion.

Further preferably the first and second axial bearings each have a plain bearing lining, wherein preferably the plain bearing linings face towards each other and wherein the plain bearing lining of the first axial plain bearing is arranged at a flange of the first bearing ring. Arranging the plain bearing lining of the first axial bearing at a flange permits really simple adjustment of the axial bearing play by means of fixing the flange to the first bearing ring, insofar as for example spacer discs are used between the flange and the ring.

In a first preferred alternative the plain bearing lining of the second axial plain bearing is arranged at the machine carrier. As an alternative thereto preferably the flange is a first flange and the first bearing ring has a second flange arranged in opposite relationship in the direction of the axis, wherein the plain bearing lining of the second axial plain bearing is arranged at the second flange.

Preferably the wind power installation according to the invention has a second bearing ring which is preferably an outer ring and which is non-rotatably connected to the generator rotor. In a preferred configuration the second bearing ring in the first bearing portion has a radially inwardly extending first collar and in the second bearing portion it has a radially inwardly extending second collar, wherein the first collar cooperates with the first axial bearing and the first radial bearing and the second collar cooperates with the second axial bearing and the second radial bearing. The collar is preferably at least portion-wise in the form of a peripherally extending annular disc which projects inwardly from the second bearing ring.

In a preferred configuration the first collar has a radially oriented first surface portion which runs in sliding relationship on the plain bearing lining of the first radial bearing and an axially oriented second surface portion which runs in sliding relationship on the plain bearing lining of the first axial bearing.

Further preferably the second collar has a radially oriented first surface portion which runs in sliding relationship on the plain bearing lining of the second radial bearing and an axially oriented second surface portion which runs in sliding relationship on the plain bearing lining of the second axial bearing.

Further preferably again the first and/or second collar, in particular the surface portions of the first and/or second collar, partially or completely comprise a metallic material. Preferably the roughness of the surface portions at the first and/or second collars involves a surface roughness $R_a$ of 1.0 µm or less, preferably 0.8 µm or less. The surface roughness can be established in generally known manner, for example in accordance with DIN EN ISO 4287:2010.

The metallic material used is preferably brass, a brass alloy, white metal, for example lead, tin, antimony, bismuth, copper, a copper alloy, in particular a copperlead casting alloy, a bronze casting alloy, in particular lead bronze, a lead bronze casting alloy, a lead tin casting alloy, aluminium, an aluminium alloy, in particular an aluminium tin casting alloy, an aluminium zinc casting alloy, steel, a steel alloy, a sintered metal or a combination of a plurality of above-mentioned metallic materials.

As an alternative to a purely metallic material preferably a metal composite material is used, for example a ceramic-metallic composite material (cermet) or a metal-plastic composite material.

Alternatively preferably an in particular non-metallic material is used for the plain bearing surfaces like for example sintered ceramic (which can have for example metal oxides as a constituent), a high-performance plastic like for example a thermoplastic high-performance polymer, in particular an amorphous thermoplastic high-performance polymer, for example polyamidimide (PAI), possibly with a graphite and/or PTFE additive.

The radial plain bearings and/or the axial plain bearings of the main bearing means are preferably in the form of hydrodynamic plain bearings.

Preferably the plain bearing linings are each partially or completely made from a fiber composite material. Further preferably applied to one, more or all plain bearing surfaces is a number of plain bearing layers each comprising one of the following materials:
  polytetrafluorethylene,
  expanded polytetrafluorethylene,
  molybdum disulphide,
  graphite,
  graphene,
  or a combination of a plurality of said materials.

If non-metallic materials are used for the plain bearing surfaces preferably a number of the plain bearing layers are made from a vapor-deposited metallic material.

Further preferably the fiber composite material has fiber material selected from the list consisting of: carbon fibers, glass fibers, steel fibers, bamboo fibers, or a combination of a plurality of said materials.

The matrix material of the fiber-reinforced fiber composite material is preferably a polymer material, for example a thermoplastic or thermosetting polymer, in particular thermosetting epoxy resin.

BRIEF DESCRIPTION OF THE SEVERAL VIEWS OF THE DRAWINGS

The invention is described in greater detail hereinafter with reference to the accompanying Figures by means of a preferred embodiment by way of example. In the Figures.

DETAILED DESCRIPTION

Figure 1:
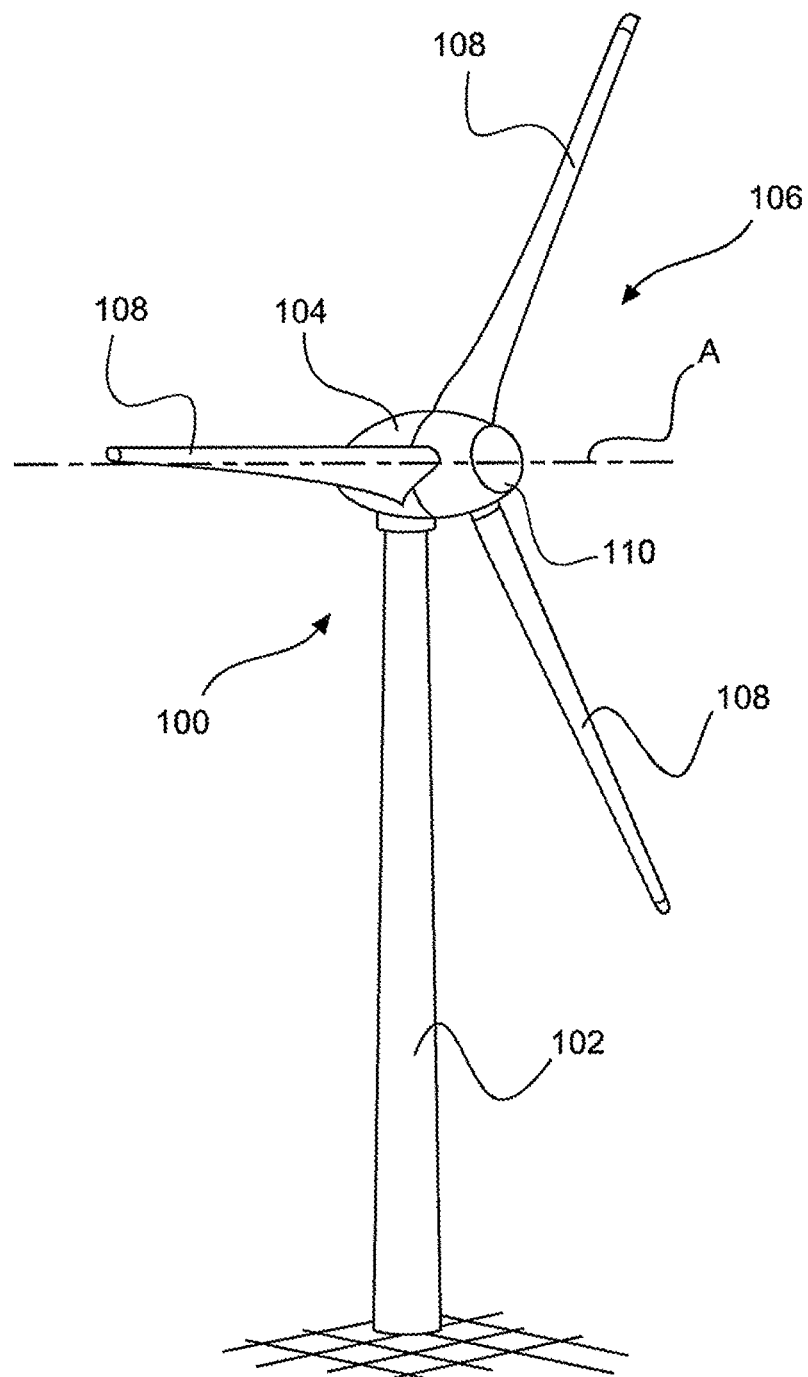
FIG. 1 shows a diagrammatic perspective view of a wind power installation according to the present invention.

FIG. 1 shows a diagrammatic view of a wind power installation 100 according to the invention. The wind power installation 100 has a pylon 102 and a pod 104 on the pylon 102. Provided on the pod 104 is an aerodynamic rotor 106 having three rotor blades 108 and a spinner 110. In operation of the wind power installation the rotor 106 is caused to rotate by means of the wind and thereby rotates a generator rotor or rotor member of a generator (see FIG. 2) which is directly or indirectly coupled to the rotor 106. The generator which is preferably a slowly rotating synchronous generator is disposed in the pod 104 and generates electrical power. The pitch angles of the rotor blades 108 are preferably variable by means of pitch motors at the rotor blade roots at the rotor blades 108. The rotor 106 and the rotor blades 108 are mounted rotatably about an axis of rotation A by means of a main bearing system or means 1 shown in greater detail in FIG. 2.

Figure 2:
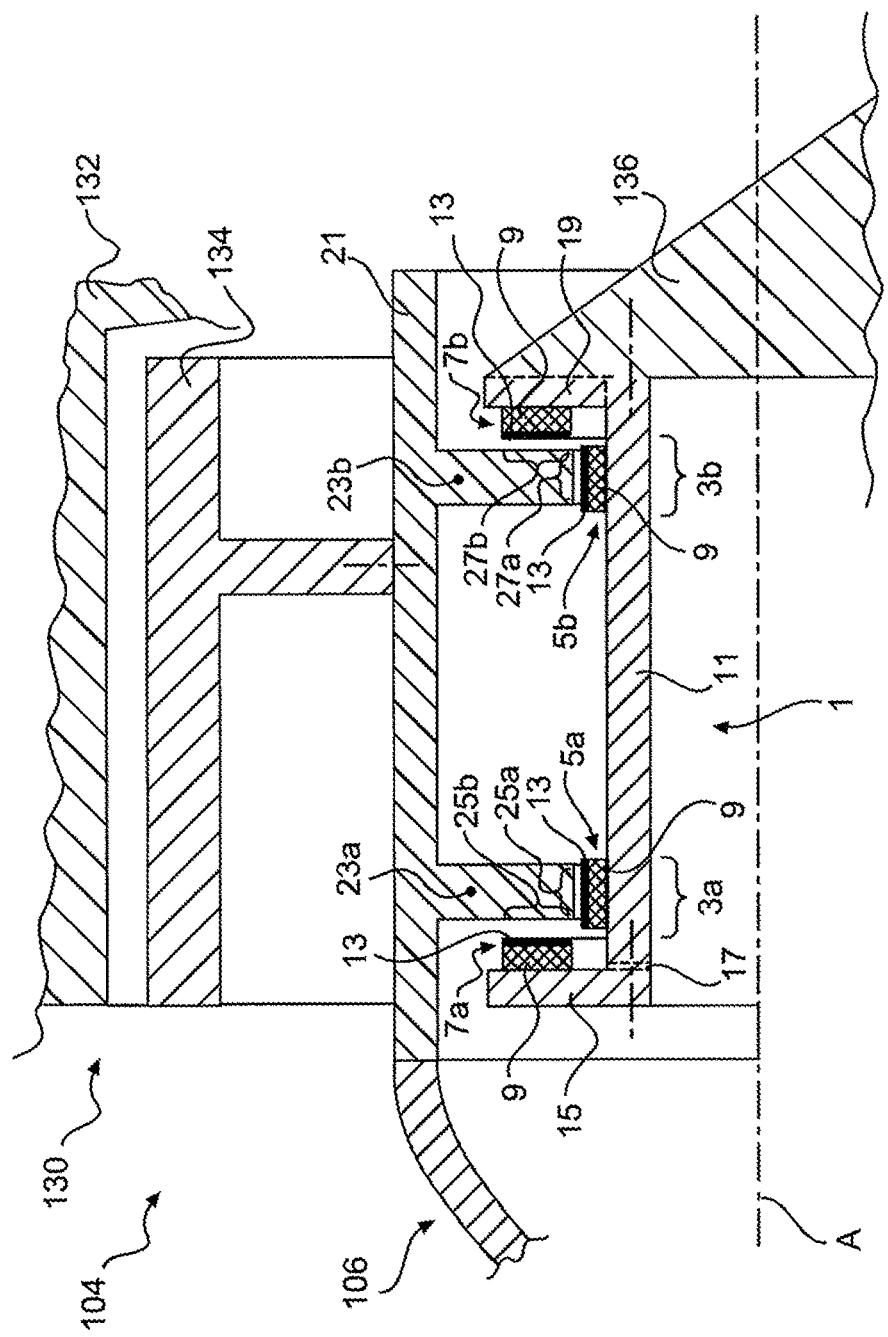
FIG. 2 shows a diagrammatic cross-sectional view relating to the pod of the wind power installation shown in FIG. 1.

The main bearing means 1 shown in FIG. 2 has a first bearing portion 3a and a second bearing portion 3b arranged in spaced relationship therewith in the direction of the axis A. The main bearing means 1 has in the first bearing portion 3a a first radial bearing 5a and a first axial bearing 7a which are each in the form of a plain bearing, preferably a hydrodynamic plain bearing. In the second bearing portion 3b the main bearing means has a second radial bearing 5b and a second axial bearing 7b which are preferably also each in the form of a plain bearing, preferably a hydrodynamic plain bearing.

The first and second radial bearings 5a, 5b each have plain bearing linings 9 which are provided on or fixed to a first bearing ring 11. The plain bearing linings 9 are preferably partially or completely made from a fiber-reinforced plastic material, for example glass fiber-reinforced plastic (GRP) and preferably have a number of friction-reducing surface layers 13. The axial bearings 7a, 7b preferably also have plain bearing linings 9 which are partially or completely made from a fiber-reinforced composite material and have a number of surface layers 13 for reducing friction.

The first axial bearing 7a is preferably provided or arranged at a first flange 15 which is reversibly releasably connected to the first bearing ring. Particularly preferably a spacer portion 17 is disposed between the first flange 15 and the first bearing ring 11 to adjust the axial bearing play of the main bearing means 1.

The second axial bearing is preferably provided or arranged at a second flange 19. The second flange 19 is optionally provided on the first bearing ring 11 or the machine carrier 136 or fixed thereto.

In addition to the first bearing ring 11 the main bearing means 1 has a second bearing ring 21 which is preferably in the form of an outer ring. The second bearing ring 21 is connected on the one hand non-rotatably to the rotor 106 and on the other hand non-rotatably to the rotor member 134 of the generator 130.

In the first bearing portion 3a the second bearing ring 21 has a first radially inwardly extending collar 23a cooperating with the first radial bearing 5a and the first axial bearing 7a of the main bearing means 1. Provided at the first collar 23a is a radially oriented first surface portion 25a which cooperates with the plain bearing lining 9 of the first radial bearing 5a to provide a plain bearing arrangement. In addition arranged at the first collar 23a is a second surface portion 25b which is oriented axially and which with the plain bearing lining 9 of the first axial bearing 7a provides a plain bearing assembly.

Similarly the second bearing ring 21 has a second radially inwardly directed collar 23b disposed in the second bearing portion 3b. The second collar 23b has a first surface portion 27a which is oriented radially and with the plain bearing lining 9 of the second radial bearing 5b forms a plain bearing. In addition the second collar 23b has a second axially directed surface portion 27*b* which with the plain bearing lining 9 of the second axial bearing 7*b* forms a plain bearing.

The surface portions 25*a*, 25*b* and 27*a*, 27*b* are preferably made from a metallic material and have a surface roughness $R_a$ of 1.0 µm or less, preferably 0.8 µm or less.

In preferred configurations it is possible to let into the collars 23*a*, 23*b* at the surface portions 25*a*, 25*b* and 27*a*, 27*b* metallic inserts which are changed after a predetermined wear limit is reached.

The plain bearing linings 9 of the plain bearings 5*a*, 5*b* and 7*a*, 7*b* are preferably in the form of segmented plain bearing linings and are each reversibly releasably connected to the bodies 11, 15, 19 carrying them in order in that way that they can be changed when a predetermined wear limit is reached.

The invention claimed is:

1. A wind power installation comprising:
   one or more rotor blades;
   a rotor hub, the one or more rotor blades being mounted to the rotor hub; and
   a generator for generating electrical power, wherein the generator has a generator stator and a generator rotor, wherein the generator rotor is non-rotatably coupled to the rotor hub and is rotatable about an axis,
   wherein the rotor hub and the generator rotor have a common main bearing system that includes first and second bearing portions spaced apart from each other in a direction of the axis,
   wherein the first bearing portion has a first radial plain bearing and a first axial plain bearing, and wherein the second bearing portion has a second radial plain bearing and a second axial plain bearing.

2. The wind power installation according to claim 1 wherein the first and second radial plain bearings each have a plain bearing lining, and wherein the plain bearing linings of the first and second radial plain bearings are arranged on a common first bearing ring.

3. The wind power installation according to claim 2 comprising a pod having a fixedly installed machine carrier and the common first bearing ring is fixedly coupled to the machine carrier.

4. The wind power installation according to claim 2 wherein the first and second axial plain bearings, each have a plain bearing lining, and wherein the plain bearing lining of the first axial plain bearing is arranged at a flange of the common first bearing ring.

5. The wind power installation according to claim 4 wherein the plain bearing lining of the second axial plain bearing is arranged at a machine carrier.

6. The wind power installation according to claim 4 wherein the flange is a first flange, wherein the common first bearing ring has a second flange arranged in opposite relationship in the direction of the axis, and wherein the plain bearing lining of the second axial plain bearing is arranged at the second flange.

7. The wind power installation according to claim 1 wherein the common main bearing system has a second bearing ring that is non-rotatably coupled to the generator rotor.

8. The wind power installation according to claim 7 wherein the second bearing ring in the first bearing portion has a radially inwardly extending first collar and in the second bearing portion has a radially inwardly extending second collar, wherein the first collar cooperates with the first axial plain bearing, and wherein the first radial plain bearing and the second collar cooperates with the second axial plain bearing and the second radial plain bearing.

9. The wind power installation according to claim 8 wherein the first collar has a radially oriented first surface portion which runs in sliding relationship on a plain bearing lining of the first radial plain bearing and an axially oriented second surface portion which runs in sliding relationship on the plain bearing lining of the first axial plain bearing.

10. The wind power installation according to claim 8 wherein the second collar has a radially oriented first surface portion which runs in sliding relationship on a plain bearing lining of the second radial plain bearing and an axially oriented second surface portion which runs in sliding relationship on the plain bearing lining of the second axial plain bearing.

11. The wind power installation according to claim 1 wherein at least one of the first and second radial plain bearings and the first and second axial plain bearings is a hydrodynamic plain bearing.

12. The wind power installation according to claim 2 wherein the plain bearing linings are partially or completely made from a fiber composite material.

13. The wind power installation according to claim 12 wherein the plain bearing linings include a plurality of plain bearing layers comprising one of the following materials:
    polytetrafluorethylene,
    expanded polytetrafluorethylene,
    molybdum disulphide,
    graphite,
    graphene,
    vapor-deposited metallic material, or
    a combination of at least two of the above materials.

14. The wind power installation according to claim 12 wherein the fiber composite material has:
    carbon fibers,
    glass fibers,
    steel fibers,
    bamboo fibers, or
    a combination of at least two of the above fibers.

15. The wind power installation according to claim 2 wherein the common first bearing ring is an inner ring of the common main bearing system.

16. The wind power installation according to claim 4 wherein the plain bearing linings of the first and second axial plain bearings face each other.

17. The wind power installation according to claim 7 wherein has the second bearing ring is an outer ring of the common main bearing system.

* * * * *